United States Patent Office 2,969,162
Patented Jan. 24, 1961

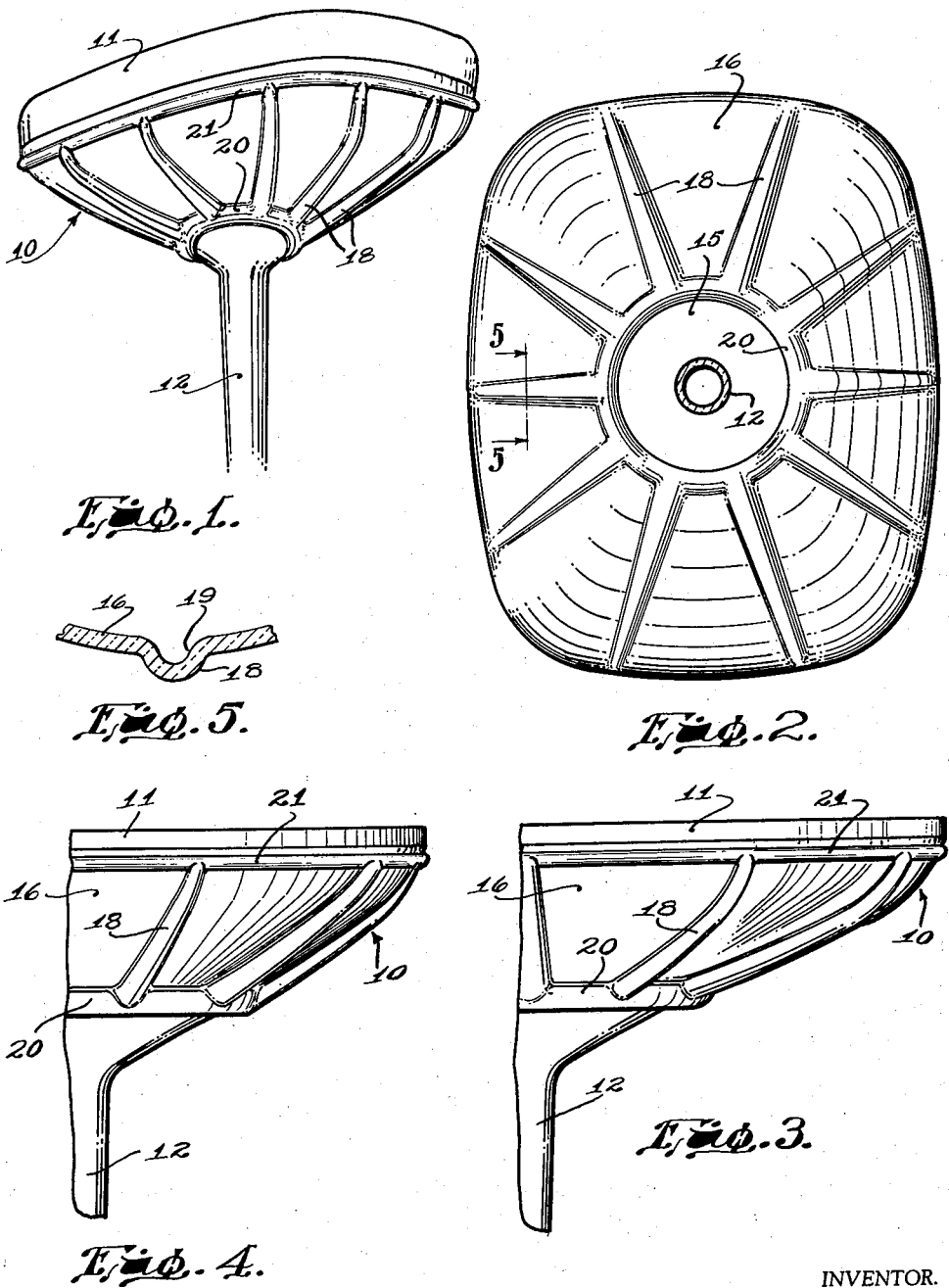

2,969,162
MOLDED PICTURE TUBE
William A. Stutske, Toledo, Ohio, assignor to Kimble Glass Company, a corporation of Ohio
Filed Apr. 22, 1957, Ser. No. 654,106
6 Claims. (Cl. 220—2.1)

My invention relates to molded articles of glass or thermoplastic material. An object of the invention is to provide means for strengthening such articles.

The invention is of utility when applied to cathode-ray tubes and is herein illustrated and described as incorporated in funnel bodies or funnels which form a part of such television picture tubes. Such tubes when made of glass are commonly molded in separate parts including a funnel body or funnel, a face plate and a neck tube extending from the neck end of the funnel body, said parts being sealed together during the process of manufacturing the picture tube. The funnel or body comprises walls which are flared or divergent from the smaller or neck end towards the larger or face plate end to which the face plate is united.

In order to avoid excessive weight and undue length of the tube as measured between the said ends thereof the side walls are flared at as wide an angle of divergence as is practical. The tubes are always vacuumized and thereby subjected to an unbalanced atmospheric pressure which places a strain on the tubes. As the angle of divergence of the side walls is increased their convexity is reduced so that their ability to withstand the atmospheric pressure is correspondingly reduced.

An object of the present invention is to provide means for strengthening the funnel body at its weaker points so as to effectively withstand the pressure to which they are subjected. For this purpose the flared walls of the tube are formed with radially disposed strengthening ribs. To further strengthen the structure an annular strengthening rib is provided surrounding and adjacent to the neck end of the funnel, the annular rib being merged into or united with the end portions of the radial ribs. A similar annular rib may unite the end portions of the radial ribs adjacent the rim of the funnel. The ribs are preferably formed on the exterior surfaces of the funnel body. They are also trough-shaped or concavo-convex in cross section, presenting grooves extending along the inner surfaces of the funnel walls.

Referring to the accompanying drawings:

Fig. 1 is a perspective view of a cathode-ray tube, ordinarily referred to as a television picture tube;

Fig. 2 is a face view of the exterior surface of the funnel body;

Fig. 3 is a fragmentary side elevation of the tube;

Fig. 4 is an end elevation of the tube; and

Fig. 5 is a detailed section at the line 5—5 on Fig. 2.

Referring to Fig. 1 the cathode-ray tube or bulb comprises a funnel body 10, usually referred to as the funnel, a face plate 11, and a tubular stem 12, said parts being integrally united or sealed together.

The funnel body may be molded by a centrifugal molding process such as disclosed in the patent to Reynolds 2,777,712, November 27, 1956, Centrifugal Molds and Method. Such a method is also disclosed in my now-abandoned application, Ser. No. 647,649, filed March 21, 1957 for Molds. The said copending application illustrates a centrifugal mold design and adapted for molding the article disclosed in the present application.

The tubular stem 12 opens into the funnel body through the lower or neck opening 15 of the funnel which, as shown, is circular. The upper or face plate end of the funnel is approximately rectangular. The walls 16 of the funnel are upwardly and outwardly flared as shown in Figs. 3 and 4. They are also bowed or outwardly convex as compared with radial lines extending from the neck to the rim of the funnel. The walls as shown are widely divergent, approximating a flat surface. In such a construction the funnel walls are subjected to atmospheric pressure which places a strain on them. These walls when approximately flat cannot withstand such high pressure as walls which are more convex or bowed outwardly as they may be in a tube in which the divergence of the walls is not so great. When the divergence of the walls is more than 90° the funnels are referred to as wide-angle funnels. This divergence may be within the range of 90 to 180°.

In order to strengthen the walls they are formed with radially disposed strengthening ribs 18, each extending from the rim of the funnel neck opening 15 or from a point near such rim to a point near the outer rim of the funnel. As shown the ribs 18 are arranged in an annular series and are spaced apart at substantially equal angular distances circumferentially of the funnel. These ribs may also be tapered towards their outer ends. The ribs are formed on the exterior surfaces of the funnel walls and as shown in Fig. 5 are trough shaped in cross section. The wall thickness of the ribs may be substantially equal to that of the adjoining wall portions of the funnel. The contour of the ribs is such as to form a concave surface 19 or groove extending lengthwise of the ribs.

In order to further strengthen the funnel body the latter is formed with an annular rib 20 which is closely adjacent to or may form the boundary of the circular opening 15. The rib 20 is also formed on the exterior surface of the funnel walls and in substantially the same shape in cross section as the radial ribs. The radial ribs 18 extend outwardly from the annular rib 20, the inner and outer surfaces of the radial ribs merging respectively into the inner and outer surfaces of the annular rib 20. The shape of the ribs 18 and 20 as seen in cross-section is such as to avoid any sharp angles or contours which would generate stresses within the glass. The depth of the ribs is preferably less than the width, as appears in Fig. 5.

A second annular rib 21 may be provided for still further strengthening the funnel body. The rib 21 is at the outer or upper end of the radial ribs 18 and merged thereinto. The form of the rib 21 and its union with the radial ribs may be substantially the same as above described in connection with the rib 20.

Modifications may be resorted to within the spirit and scope of my invention as defined in the claims.

I claim:

1. A wide-angle television picture tube envelope comprising a substantially funnel-shaped hollow glass body consisting essentially of funnel and flanged face plate members, the large end of said funnel being approximately rectangular in shape and having said flanged face plate sealed thereto, said funnel having flared sidewalls extending between its ends, said sidewalls being bowed outwardly between said ends, said funnel sidewalls having strengthening ribs formed therein extending radially between said ends, said ribs being essentially equi-spaced about the envelope axis and trough-shaped in cross-section with their outer surfaces convex and their inner surfaces concave, said inner surfaces being depressed below the plane of adjoining surface portions of said sidewalls, the said funnel sidewalls and strengthening ribs having substantially equal thickness throughout their cross-sectional areas, and at least one integral annular rib disposed contiguous with a terminating region of said funnel uniting the ends of said radial ribs in a common plane normal to the envelope axis.

2. A television picture tube envelope comprising a substantially funnel-shaped hollow glass body consisting of funnel, neck and flanged face plate members, the large end of said funnel being approximately rectangular in shape and having said flanged face plate sealed thereto, the small end of said funnel being approximately circular in shape and having said neck sealed thereto, the sidewalls of said funnel bowed outwardly between its sealed ends, said funnel being formed with a series of integral strengthening ribs extending radially from the said smaller to the larger end thereof, the said ribs being essentially equi-spaced about the envelope axis, the said ribs being integral with and positioned on the exterior surface of the funnel sidewalls, the said ribs forming coincident grooves on the inner surface of the funnel sidewalls, said funnel being formed with an integral annular strengthening rib adjacent the area of joinder of its smaller end to said neck, said annular rib being formed on the exterior surface of the sidewalls, the said radial ribs merging into the said annular rib.

3. The television picture tube envelope defined in claim 2, said funnel being formed with an integral annular strengthening rib positioned adjacent to the large sealed end of said funnel, said large annular rib being formed on the exterior surface of the funnel sidewalls with the diverging ends of said radial ribs merging thereinto.

4. A wide-angle television picture tube envelope comprising a substantially funnel-shaped hollow glass body having a flanged face plate member sealed to the large end thereof, said glass body comprising a smoothly contoured modified frusto-pyramidal member having radial strengthening ribs formed in essentially equi-spaced relationship integral with and in the flared walls of the tube body, the body being formed with two annular strengthening ribs disposed contiguous with the smaller and larger ends respectively and integral with the said tube body, the ends of said radial ribs terminating at and merging into the said two annular ribs, both said radial and annular ribs projecting exteriorly with smoothly curved concavo-convex cross-sectional contours, the said ribs and flared walls of said body having substantially equal cross-sectional thicknesses.

5. A television picture tube envelope comprising a substantially funnel-shaped hollow glass body having a flanged face plate member sealed to its large end and a neck member sealed to its small end, said glass body having a series of equi-spaced radially disposed strengthening ribs formed integrally in its flared sidewalls, said ribs being concavo-convex in cross section throughout their length with their convex surfaces projecting beyond the plane of the outer wall surfaces and their concave surfaces depressed beneath the plane of the inner wall surfaces, said body being formed with at least one annular strengthening rib closely adjacent one end of said body uniting the adjacent ends of said radial ribs.

6. A wide-angle television picture tube envelope comprising a substantially funnel-shaped hollow glass body, said body consisting essentially of funnel, neck and flanged face plate members, said funnel being sealed at its large end to said flanged face plate and at its small end to said neck, said tube envelope having sidewalls widely flared at an obtuse angle such that the diameter of the said funnel at its large end is substantially greater than its axial dimension, said funnel being formed with an annular strengthening rib adjacent the small end thereof and an annular strengthening rib adjacent the large end thereof, an annular series of uniformly-spaced radial ribs extending between and uniting said annular ribs, all of said ribs being formed on the exterior surface and integral with the sidewalls of said funnel and all being trough-shaped in cross-section with their outer surfaces convex and their inner surfaces concave depressed below the plane of adjoining surface portions of the funnel sidewalls, the said radial ribs being merged smoothly at their ends into the said annular ribs, the radial ribs varying in cross-sectional dimensions from the annular rib of smaller diameter toward the annular rib of larger diameter, the wall thickness of the ribs being substantially equal to the thickness of the adjoining wall portions of the tube funnel.

References Cited in the file of this patent
UNITED STATES PATENTS

| | | |
|---|---|---|
| 299,318 | Atterbury | May 27, 1884 |
| 423,833 | Stiveson | Mar. 18, 1890 |
| 608,905 | Pilkington | Aug. 9, 1898 |
| 2,460,608 | Stegho | Feb. 1, 1949 |
| 2,686,390 | Williams | Aug. 17, 1954 |
| 2,690,518 | Fyler | Sept. 28, 1954 |

FOREIGN PATENTS

| | | |
|---|---|---|
| 202,962 | Australia | Apr. 28, 1955 |
| 867,824 | France | Sept. 1, 1941 |